(12) United States Patent
Armstrong et al.

(10) Patent No.: US 12,017,788 B2
(45) Date of Patent: Jun. 25, 2024

(54) WINDMILL SYNCHRONIZATION IN AN ELECTRIC PROPULSION SYSTEM

(71) Applicant: Rolls-Royce North American Technologies, Inc., Indianapolis, IN (US)

(72) Inventors: Michael James Armstrong, Indianapolis, IN (US); Mark Jon Blackwelder, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 409 days.

(21) Appl. No.: 17/446,341

(22) Filed: Aug. 30, 2021

(65) Prior Publication Data

US 2021/0387742 A1    Dec. 16, 2021

Related U.S. Application Data

(63) Continuation of application No. 15/437,485, filed on Feb. 21, 2017, now Pat. No. 11,104,447.
(Continued)

(51) Int. Cl.
*H02P 1/04*    (2006.01)
*B60L 15/38*    (2006.01)
(Continued)

(52) U.S. Cl.
CPC ............ *B64D 35/02* (2013.01); *B60L 15/38* (2013.01); *B63H 23/24* (2013.01); *B63J 3/00* (2013.01);
(Continued)

(58) Field of Classification Search
CPC .... B64D 27/24; B64D 2221/00; B64D 35/02; B64D 31/12; B60L 50/13; B60L 2200/10;
(Continued)

(56) References Cited

U.S. PATENT DOCUMENTS 2,720,927 A * 10/1955 Mergen ................. B64C 11/305
                                                      73/507
2,794,507 A    6/1957 Banning, Jr.
(Continued)

FOREIGN PATENT DOCUMENTS

DE    2623659 A1    12/1976
EP    2581308 A2    4/2013
(Continued)

OTHER PUBLICATIONS

Office Action from counterpart Canadian Application No. 2,954,717 dated Feb. 27, 2023, 5 pp.
(Continued)

*Primary Examiner* — Thai T Dinh
(74) *Attorney, Agent, or Firm* — Shumaker & Sieffert, P.A.

(57) ABSTRACT

A propulsion system is described that includes an electrical bus, a generator configured to provide electrical power to the electrical bus, a plurality of propulsors configured to provide thrust by simultaneously being driven by the electrical power at the electrical bus, and a controller. The controller is configured to synchronize a rotational speed of an individual propulsor from the plurality of propulsors with a rotational speed of the generator after the individual propulsor has become unsynchronized with the rotational speed of the generator by controlling at least one of the rotational speed of the generator, nozzle area of the individual propulsor, or a pitch angle of the individual propulsor.

19 Claims, 5 Drawing Sheets

Related U.S. Application Data

(60) Provisional application No. 62/312,586, filed on Mar. 24, 2016.

(51) Int. Cl.
| | | |
|---|---|---|
| *B63H 23/24* | (2006.01) | |
| *B63J 3/00* | (2006.01) | |
| *B64D 27/24* | (2006.01) | |
| *B64D 31/12* | (2006.01) | |
| *B64D 35/02* | (2024.01) | |
| *B65D 27/24* | (2006.01) | |
| *G01P 3/48* | (2006.01) | |

(52) U.S. Cl.
CPC ............. *B64D 27/24* (2013.01); *B64D 31/12* (2013.01); *G01P 3/48* (2013.01); *H02P 1/04* (2013.01); *B60L 2200/10* (2013.01); *B63J 2003/002* (2013.01); *B64D 2221/00* (2013.01)

(58) Field of Classification Search
CPC ....... H02P 2101/30; H02P 1/04; B63H 21/17; B63J 3/00
See application file for complete search history.

(56) References Cited

U.S. PATENT DOCUMENTS

| | | | |
|---|---|---|---|
| 3,007,529 A | | 11/1961 | Brockert et al. |
| 3,066,741 A | * | 12/1962 | Barnes .................... B64C 11/50 416/34 |
| 4,338,525 A | * | 7/1982 | Kilgore .................... H02P 1/52 318/148 |
| 4,409,533 A | | 10/1983 | Kawabata |
| 4,927,329 A | * | 5/1990 | Kliman .................... F01D 7/00 416/129 |
| 4,958,289 A | | 9/1990 | Sum et al. |
| 5,629,567 A | | 5/1997 | Kumar |
| 7,218,070 B2 | | 5/2007 | Ylitalo |
| 7,802,757 B2 | | 9/2010 | Dooley et al. |
| 7,989,977 B2 | | 8/2011 | Crane |
| 8,076,881 B1 | | 12/2011 | Hall et al. |
| 8,299,638 B2 | | 10/2012 | Sandoy et al. |
| 8,310,794 B2 | | 11/2012 | Pensar |
| 8,354,768 B2 | | 1/2013 | Cipriani |
| 8,552,575 B2 | | 10/2013 | Teets et al. |
| 8,622,002 B2 | | 1/2014 | Jockel |
| 8,727,271 B2 | | 5/2014 | Salyer |
| 9,209,732 B2 | | 12/2015 | Radan |
| 9,425,713 B2 | | 8/2016 | Haugland |
| 9,882,513 B2 | | 1/2018 | Armstrong et al. |
| 9,963,228 B2 | * | 5/2018 | McCullough ............. B64C 1/28 |
| 10,315,761 B2 | * | 6/2019 | McCullough ........... B64C 39/02 |
| 10,850,835 B2 | * | 12/2020 | Hutson ............... B64C 29/0016 |
| 11,104,447 B2 | | 8/2021 | Armstrong et al. |
| 2007/0293104 A1 | | 12/2007 | Sandoy et al. |
| 2010/0274420 A1 | | 10/2010 | Veit et al. |
| 2011/0080040 A1 | | 4/2011 | Kumar |
| 2012/0101671 A1 | | 4/2012 | Caouette |
| 2014/0203739 A1 | | 7/2014 | Chantriaux et al. |
| 2014/0346283 A1 | | 11/2014 | Salyer |
| 2016/0365810 A1 | | 12/2016 | Armstrong et al. |
| 2018/0170190 A1 | | 6/2018 | Siegel et al. |
| 2018/0257787 A1 | | 9/2018 | Hamel et al. |

FOREIGN PATENT DOCUMENTS

| | | |
|---|---|---|
| JP | 59218370 | 12/1984 |
| JP | 61157280 | 6/1986 |
| JP | 2000228898 | 8/2000 |
| JP | 5515885 B2 | 9/2011 |
| JP | 201193568 A | 9/2011 |
| KR | 20080034397 A | 4/2008 |
| KR | 20100111707 A | 10/2010 |
| KR | 20140001853 A | 1/2014 |
| KR | 20140042026 A | 4/2014 |
| KR | 20140080563 A | 6/2014 |
| WO | 0126962 A1 | 4/2001 |
| WO | 2005006536 A1 | 1/2005 |
| WO | 2006037412 A1 | 4/2006 |

OTHER PUBLICATIONS

Response to Office Action dated Feb. 27, 2023, from counterpart Canadian Application No. 2,954,717 filed Jun. 21, 2023, 24 pp.
Extended Search Report from counterpart European Application No. 17158098.8, dated Aug. 18, 2017, 8 pp.
Berg et al., "HTS Electrical System for a Distributed Propulsion Aircraft," IEEE Transactions on Applied Superconductivity, vol. 25, No. 3, Jun. 2015, 5 pp.
Communication Pursuant to Rules 69EPC and 70a(1) EPC dated Oct. 2, 2017, from counterpart European Application No. 17158068.8, 2 pp.
Response to Communication pursuant to Rules 69EPC and 70a(1) dated Oct. 2, 2017, and the Response to Extended Search Report dated Aug. 8, 2017, from counterpart European Application No. 17158068.8., 7 pp.
Intent to Grant dated Jun. 29, 2018, from counterpart European Application No. 17158098.8, 1 pp.
Prosecution History from U.S. Appl. No. 15/437,485, dated Jul. 2, 2018 through May 5, 2021, 116 pp.
Cast, "Propeller Operation and Malfunctions Basic Familiarization for Flight Crews", SKYbrary Bookshelf, Retrieved on Jan. 6, 2016 from http://skybrary.aero/bookshelf/content/bookDetails.php?bookId=3703, 16 pgs.
Notice of Intent to Grant from counterpart Canadian Application No. 2,954,717 dated Feb. 8, 2024, 1 pp.

* cited by examiner

WINDMILL SYNCHRONIZATION IN AN ELECTRIC PROPULSION SYSTEM

This application claims the benefit of U.S. patent application Ser. No. 15/437,485, filed Feb. 21, 2017, which claims the benefit of U.S. Provisional Application No. 62/312,586, filed Mar. 24, 2016, the entire contents of which are hereby incorporated by reference.

TECHNICAL FIELD

The disclosure relates to techniques for controlling turboelectric distributed propulsion (TeDP) systems.

BACKGROUND

Some aircraft use turboelectric distributed propulsion (TeDP) systems for distributing electrical power from onboard generators to one or more propulsors. A TeDP system is a type of propulsion system, typically used for fixed-wing aircraft, in which turboelectric machines and corresponding propulsors are distributed about the vessel. Each propulsor may include a motor for driving a propeller or fan that spins at a certain rotational speed so as to propel a vehicle and positively affect its aerodynamic and hydrodynamic performance. Some TeDP systems may drive each propulsor motor, directly, using variable frequency, AC power that is produced by a generator being driven by a turboshaft engine.

Powering propulsor motors directly using an AC distribution system may come with challenges. For example, for systems which use machines with low asynchronous reactance each propulsor motor must maintain rotational speed synchronicity with the generator. If synchronicity between the generator and a propulsor motor is lost (e.g., due to a torque spike caused by debris and/or bird ingestion), the TeDP system may be unable to drive the propulsor fan or propeller and consequently, the aircraft may lose thrust.

Some system may manage synchronization during system startup (e.g., using a generator field controller) as the gas turbine accelerates from zero rotational speed when low asynchronous reactance machines are used. However, if a single propulsor or group of propulsors loses synchronization in operation (e.g., during flight), it is not feasible to stop engine rotation to perform resynchronization from zero rotational speed. Some systems may include additional components, such as variable speed power electronics of a variable speed drive system, for resynchronizing a propulsor with a generator during flight. However, additional components such as these inevitably increase system mass and increase system losses, resulting in a more expensive and/or overall less efficient system.

SUMMARY

In one example, the disclosure is directed to a propulsion system that includes an electrical bus; a generator configured to provide electrical power to the electrical bus; a propulsor configured to provide thrust by simultaneously being driven by the electrical power at the electrical bus; and a controller configured to synchronize a rotational speed of the propulsor with a rotational speed of the generator after the propulsor has become unsynchronized with the rotational speed of the generator by controlling at least one of the rotational speed of the generator, nozzle area of the propulsor, and a pitch angle of the propulsor.

In another example, the disclosure is directed to a system that includes means for determining whether a frequency of an individual propulsor from a plurality of propulsors of a propulsion system is synchronized with a frequency of a generator; and means for controlling, in response to determining that the frequency of the individual propulsor is not synchronized with the frequency of the generator, at least one of the rotational speed of the generator, a pitch angle of the individual propulsor, and propulsor nozzle area to synchronize the frequency of the individual propulsor with the frequency of the generator.

In yet another example, the disclosure is directed to a method that includes determining, by a controller of a propulsion system, whether a frequency of an individual propulsor from a plurality of propulsors is synchronized with a frequency of a generator that is driving the plurality of propulsors; and responsive to determining that the frequency of the individual propulsors is not synchronized with the frequency of the generator, controlling, by the controller, at least one of the rotational speed of the generator, nozzle area of the individual propulsor, and a pitch angle of the individual propulsor to synchronize the rotational speed of the individual propulsor with the rotational speed of the generator.

The details of one or more examples are set forth in the accompanying drawings and the description below. Other features, objects, and advantages of the disclosure will be apparent from the description and drawings, and from the claims.

DETAILED DESCRIPTION

In general, techniques and circuits of this disclosure may enable an example electric propulsion system, such as a turboelectric distributed power (TeDP) system on a multi-propeller aircraft, to individually synchronize a propulsor driven by a low asynchronous reactance machine that has fallen out of synchronization with a power source and/or other propulsors of the system. Rather than relying on variable speed drive systems or heavier and machines with higher losses which have high asynchronous reactance to regain synchronization after an in-operation, unsynchronization event, the example propulsion system uses fault isolators and windmilling techniques to bring an out-of-synch propulsor back in synchronization with a power source.

For example, when a propulsor falls out of synchronization, the example propulsion system may disengage the propulsor from an electrical bus to isolate the propulsor from the rest of the electric propulsion system. With the propulsor disengaged, the propulsion system may perform "windmilling" techniques by varying the pitch of the out-of-synch propulsor and/or by varying a generator rotational speed until the motor frequency of the out-of-synch propulsor converges to within an acceptable tolerance of the operating frequency of the generator. That is, by varying the generator rotational speed, the pitch of the propulsor, and/or the variable area of a nozzle of the propulsor, the propulsion system may employ a moment imparted by the fluid (e.g., air) passing over the disengaged propulsor thereby resulting in an increase in rotational speed of the disengaged propulsor. Once the generator and propulsor frequencies are back in synchronization and operating at or near the same rotational speed, the propulsion system may reengage the propulsor with the electrical bus so as to resume regular propulsor operations.

By enabling the example propulsion system to resynchronize a propulsor to a generator following an in-operation unsynchronization event, without using a variable speed drive system or asynchronous reactance machine features, the example propulsion system can ensure maximum operating capacity from all of the propulsors, without increased mass and losses that typically arise from variable speed drive systems. As such, an aircraft that relies on the example propulsion system as described herein may operate more efficiently, cost less, and have a greater operating range.

Figure 1:
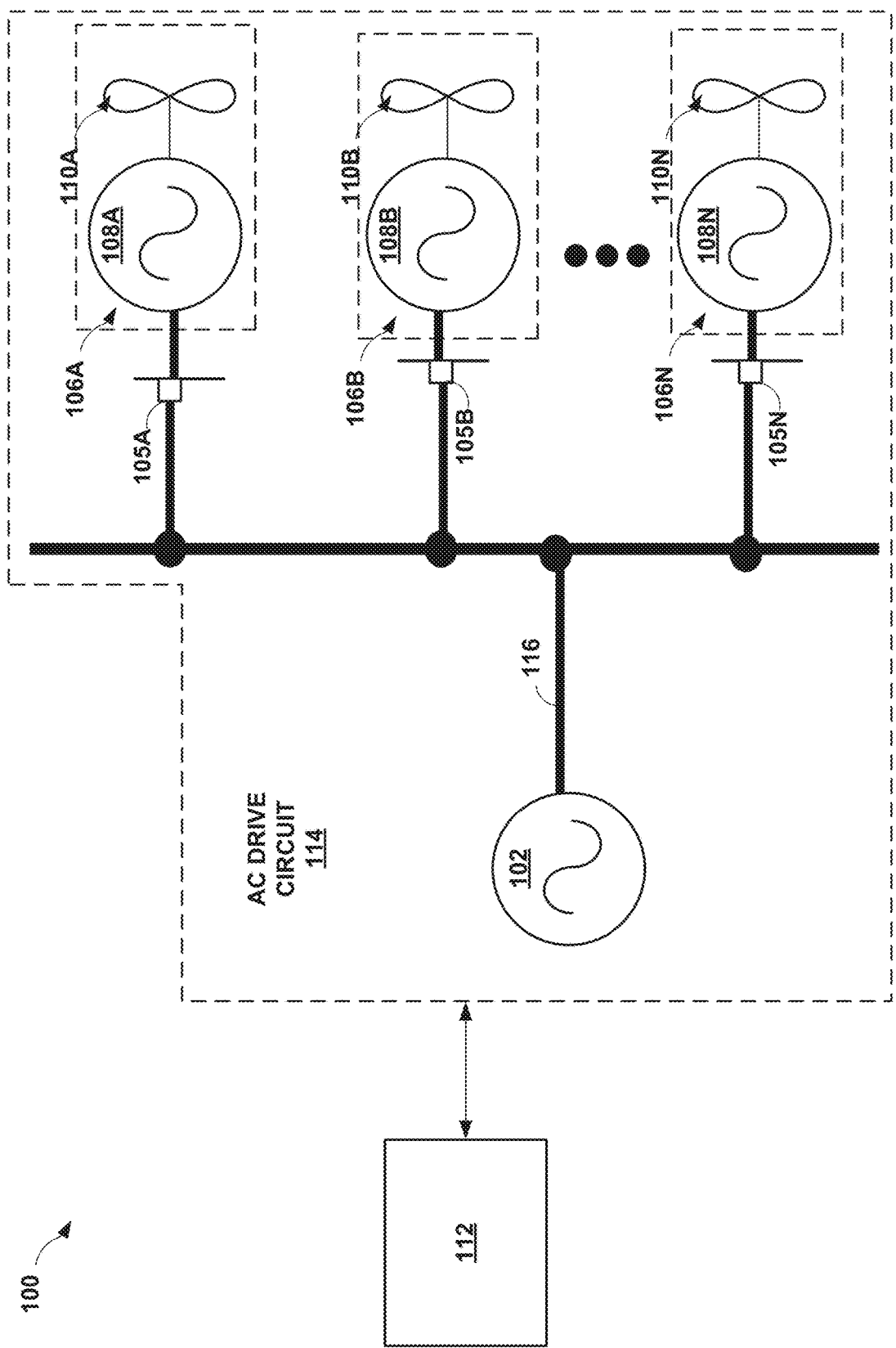
FIG. 1 is a conceptual diagram illustrating an example electric propulsion system configured to maintain synchronization between multiple propulsors and a shared power source, in accordance with one or more aspects of the present disclosure.

FIG. 1 is a conceptual diagram illustrating system 100 as an example electric propulsion system configured to maintain synchronization between multiple propulsors 106A-106N (collectively "propulsors 106") and a shared power source 102, in accordance with one or more aspects of the present disclosure. Electric propulsion system 100 is a variable frequency, three-phase AC distribution system that may be found on some aircraft for distributing electrical power to one or more propulsor motors. In other examples, electric propulsion system 100 may be an AC distribution system of any number of phases. Although described generally with respect to aircraft, the techniques of this disclosure may also apply to marine craft that rely on systems such as system 100 to maintain synchronization between multiple propulsors and a shared power source 102.

System 100 includes AC drive circuit 114 and controller 112. AC drive circuit 114 includes AC power bus 116, AC generator 102, a plurality of propulsors 106, and isolation devices 105A-105N (collectively "isolation devices 105"). Each of propulsors 106 includes one of propulsor motors 108A-108N (collectively "motors 108") and one of propulsor fans 110A-110N (collectively "propulsor fans 110"). In other examples, system 100 may include additional or fewer components than those shown.

AC drive circuit 114 is configured to distribute the AC electrical current provided by AC generator 102, via AC power bus 116, to each of propulsors 106 for simultaneously driving the plurality of propulsor motors 108. AC generator 102 represents any high voltage or high current variable frequency, AC power source for use in an electric propulsion system such as system 100. AC generator 102 is configured to provide electrical power to electrical bus 116. For example, AC generator 102 may be a generator driven by a turboshaft engine or other type of machine capable of producing electrical power to drive one or more propulsor motors, such as motors 108. In some examples, AC generator 102 may have independent sets of windings which are dedicated to each of motors 108 (essentially one machine per motor 108) or which are dedicated to subset of the motors 108. In other examples, AC generator 102 has only a shared set of windings associated with all of motors 108.

Propulsors 106 are configured to provide thrust to the aircraft that includes system 100, by simultaneously being driven by the electrical power at the electrical bus 116. Propulsors 106 are variable pitch propulsors and/or variable area nozzle propulsors that are able to vary the pitch angle of a respective propulsor fan 110 that is being driven, during operation, by a respective propulsor motor 108. In addition to, or as part of, a respective propulsor motor 108 and a respective propulsor fan 110, each of propulsors 106 includes a pitch controller (not shown) for varying the pitch of the respective propulsor fan 110. For example, propulsors 106A may receive a signal or message from controller 112 that causes propulsor 106A to alter the pitch angle of propulsor fan 110A. In response to the signal, the pitch controller of propulsor 106A may change the pitch of propulsor fan 110A accordingly.

Each of the plurality of propulsor motors 108 represents any type of motor for receiving AC electrical power provided by an electric propulsion system and converting the AC electrical power to mechanical motion. Propulsor motors 108 are shown in FIG. 1 as being propulsion motors for an aircraft, for example, for driving propulsor fans 110. Motors 108 may include additional sensors and/or feedback circuitry for providing information (e.g., voltage, current, rotational speed, frequency, phase, etc.) back to the components of system 100 that are used to control motors 108, such as controller 112.

AC power bus 116 is an electrical bus (e.g., a variable frequency, AC electrical bus) that is configured to distribute, to each of motors 108, the electrical current derived from the electrical power produced by AC generator 102. Isolation devices 105 represent isolation devices that are selectively controllable for isolating the various components of system 100 from bus 116. That is, isolation devices 105 are configurable for blocking voltages, interrupting currents and physically isolating conductors at the various components of system 100 that receive power from bus 116, which in the example of FIG. 1 include motors 108.

Examples of isolation devices 105 include power breakers, switches, converters, or any other type of electrical isolation device that is configurable for electrically coupling, and electrically de-coupling (e.g., connecting and disconnecting), an electrical component to and from an electrical bus. For instance, isolation device 105A may include one or more switches that when switched-on, electrically couple the electrical inputs of motor 108A to power bus 116 for receiving a portion of the AC electrical current produced by AC generator 102. When switched-off, the one or more switches of isolation device 105A may electrically de-couple the electrical inputs of motor 108A from power bus 116 to prevent motor 108A from receiving any AC electrical current from AC generator 102.

In some examples, isolation devices 105 are configurable by controller 112 to electrically isolate AC generator 102 from any single one of propulsor motors 108 while controller 112 performs synchronization techniques to regain synchronization between the single isolated propulsor motor 108 and AC generator 102. In some examples, isolation devices 105 are configurable by controller 112 to electrically isolate AC generator 102 from multiple propulsor motors 108 simultaneously while controller 112 performs synchronization techniques to regain synchronization between the multiple, isolated propulsor motors 108 and AC generator 102.

Controller 112 is configured to control how and when system 100 distributes, and refrains from distributing, electrical current from AC generator 102 to propulsors 106. Controller 112 may maintain synchronicity between each of propulsors 106 and AC generator 102 by controlling the rotational speed of AC generator 102 and a pitch angle and/or nozzle areas of an out-of-synch propulsor 106. For example, controller 112 may disengage any one of the individual propulsors 106 in response to that individual propulsor 106 becoming out-of-synch with AC generator 102 (and, thus, out-of-synch with other propulsors of plurality of propulsors 106). After disengaging the propulsor 106, controller 112 may vary the generator rotational speed of AC generator 102, the pitch angle of the respective propulsor fan 110, or both to synchronize the rotational speed of the propulsor motor 108 with the rotational speed of AC generator 102. Controller 112 may reengage the previously out-of-synch individual propulsor 106, when that individual propulsor 106 regains synchronization with AC generator 102, e.g., when a frequency of the individual propulsor motor 108 is sufficiently similar to a frequency of AC generator 102.

The amount of similarity between the frequency of motor 108 and generator 102 may be application dependent and can vary depending on the matching of propulsor 108 to generator 102, the types of propulsor 108, the number of motors, etc. Said differently, the quantification of "sufficient" may be dependent on the relative efficiency of the system components and other speed oscillation damping features, such as damper bars/windings, hysteresis of rotating flux channeling magnetic material, and saturation of rotating flux channeling magnetic material. In highly efficient, non-damped or lightly damped systems the sufficient tolerance to speed, angle, and voltage magnitude could be as low as 0.5%.

Controller 112 is shown as, generally, being operatively coupled to all of the components of system 100, including AC drive circuit 114. Although not specifically shown in FIG. 1, controller 112 may also be operatively coupled to each of the individual components of AC drive circuit 114, including AC generator 102, one or more of propulsors 106, propulsor motors 106, propulsor fans 110, and isolation devices 105. In other words, controller 112 may provide and/or receive signals and information, to and/or from each of the different components 102, 105, 106, 108, 110, and 114, and any other components required to cause system 100 to distribute, and refrain from distributing, electrical current from AC generator 102 to propulsors 106. For example, controller 112 may communicate with other control modules, such as a control module associated with AC generator 102 to coordinate rotational speeds and potential load dynamics with AC generator 102 during synchronization.

Controller 112 may comprise any suitable arrangement of hardware, software, firmware, or any combination thereof, to perform the techniques attributed to controller 112 herein. Examples of controller 12 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 121 includes software or firmware, controller 112 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 112 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 112 (e.g., may be external to a package in which controller 112 is housed).

Although controller 112 is generally described as being the primary unit for controlling each of the components of system 100 for performing the techniques described herein, in some examples, the individual components of drive circuit 114 may include additional functionality for performing some or all of the operations described below with respect to controller 112. For example, a combination of one or more of isolation devices 105, AC generator 102, and propulsors 106 may include components for synchronizing the rotational speed of an individual propulsor 106 with the rotational speed of AC generator 102 by controlling the rotational speed of AC generator 102 and/or a pitch angle of the individual propulsor 106.

In accordance with techniques of this disclosure, system 100 may individually synchronize each of propulsors 106 when any one propulsor 106 has fallen out of synchronization with generator 102. Rather than relying on variable speed drive systems or asynchronous reactance machine features to regain synchronization after an in-operation, unsynchronization event, controller 112 may control fault isolators 105 and perform windmilling techniques with the pitch control mechanism of the unsynchronized one of propulsors 106 to bring the out-of-synch propulsor back in synchronization with generator 102. By enabling system 100 to resynchronize propulsors 106 to generator 102 following an in-operation unsynchronization event, without using a variable speed drive system, system 100 may ensure maximum operating capacity from all of propulsors 106, without increased mass and losses that typically arise from variable speed drive systems. As such, an aircraft that relies on system 100 as described herein may operate more efficiently, cost less, and have a greater operating range.

Figure 2:
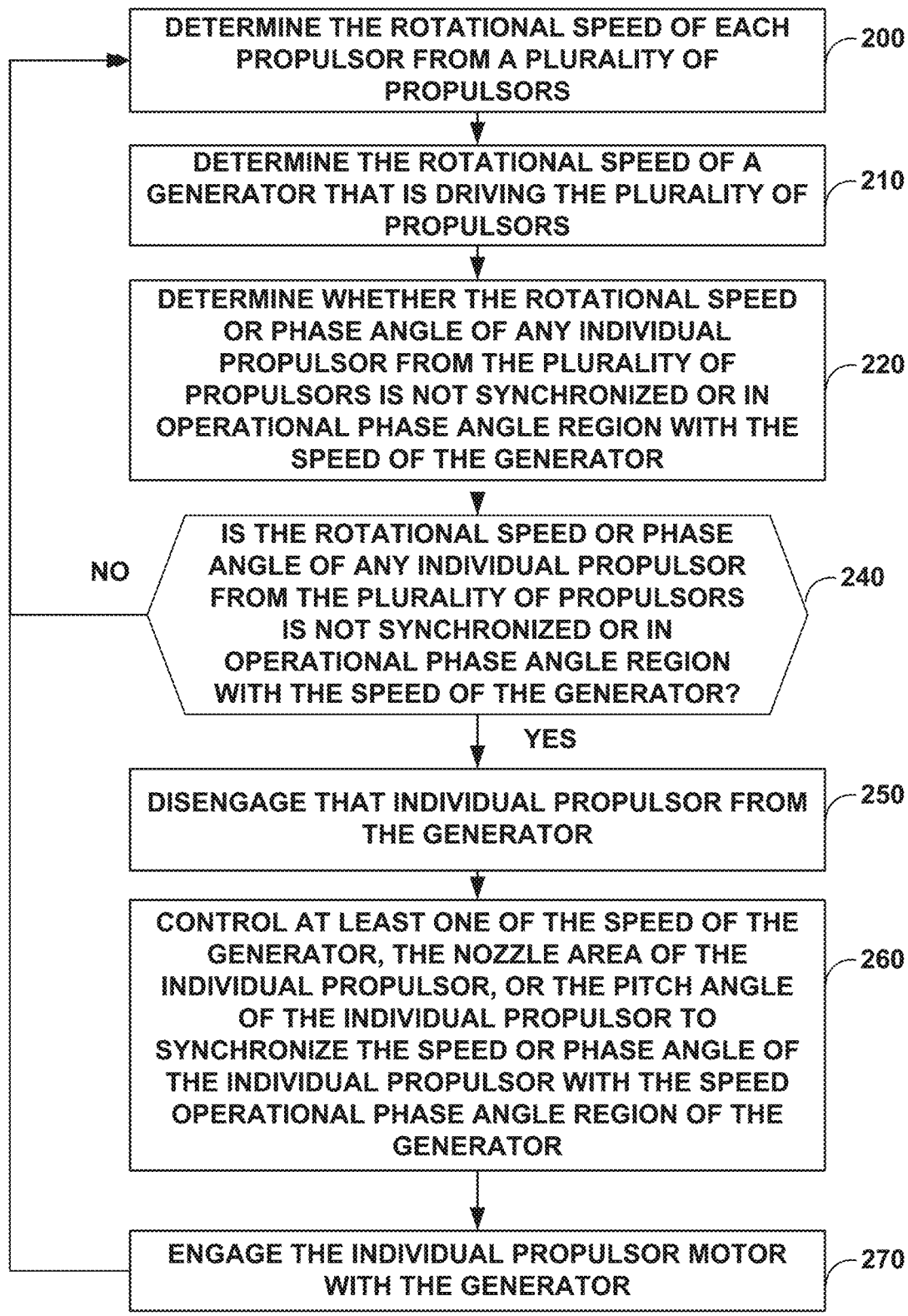
FIG. 2 is a flow chart illustrating example operations performed by an example controller configured to maintain synchronization between the multiple propulsors and the shared power source of the example electric propulsion system of FIG. 1, in accordance with one or more aspects of the present disclosure.

FIG. 2 is a flow chart illustrating example operations performed by controller 112 of system 100 to maintain synchronization between the multiple propulsors 106 and the shared AC power source 102, in accordance with one or more aspects of the present disclosure. FIG. 2 is described in the context of the components of system 100 of FIG. 1, although the technique of FIG. 2 may be implemented by other systems including additional or fewer components.

During operation of system 100 (e.g., when air or fluid is passing over propulsor fans 110), if an individual propulsors 106 is connected to AC electrical bus 116 and is being driven by the electrical current at bus 116, that propulsor 106 has a rotational speed coin defined by EQ. 1.

$$\omega_m = \frac{n_{gen}}{n_m} \omega_{gen} \qquad \text{EQ. 1}$$

Per EQ. 1, the rotational speed coin of an individual propulsor 106 depends on the rotational speed $\omega_{gen}$ of AC generator 102 and a ratio of the quantity of generator pole pairs n$_{gen}$ of AC generator 102 to quantity of motor pole pairs n$_m$ of a respective propulsor motor 108 of that propulsor 106.

However, if, during operation, an individual propulsors 106 is disconnected from AC electrical bus 116 and is not being driven by the electrical current at bus 116, that propulsor 106 may "windmill" due to the air or fluid stream continuing to pass over the propulsor fan of that individual propulsor 106, e.g., due to forward motion of the aircraft to which system 100 is connected. The rotational speed corn of a windmilling propulsor 106 is defined by EQ. 2.

$$\omega_m = f(Vel, \gamma, A)$$ EQ. 2

Per EQ. 2, the rotational speed coin of the propulsors 106, when isolated from AC electrical bus 116 and allowed to windmill, varies as a function $f$ of the vehicle velocity Vel, pitch angle $\gamma$ of the respective propulsor fan 110, and nozzle area A of the respective propulsor fan 110.

Accordingly, as defined by EQS. 1 and 2, the rotational speed $\omega_m$ of an individual propulsor 106 can be increased by decreasing the pitch angle $\gamma$ of a propulsor fan 110 relative to its respective angle of attack a and/or increasing the velocity Vel of the vehicle. As such, rather than relying on variable speed drive systems to regain synchronization after an in-operation, unsynchronization event for one or more propulsors 106, system 100 may utilize a combination of fault isolators and windmilling techniques to bring an out-of-synch propulsor 106 back in synchronization with AC generator 102.

In operation, controller 112 may determine the rotational speed or operational phase angle of each propulsor from a plurality of propulsors 106 (200) and controller 112 may determine the rotational speed or operational phase angle region of a generator 102 that is driving the plurality of propulsors (210). For example, during flight, controller 112 may receive information (e.g., as one or more signals, data, or other forms of information) from AC drive circuit 114 that is indicative of the rotational speed, voltage, frequency, and/or phase associated with each individual motor 108 as well as the rotational speed, voltage, frequency, and/or phase associated with AC generator 102. Controller 112 may receive the information via one or more sensors embedded in, or coupled to, any of the components of AC drive circuit 114.

Controller 112 may determine whether the rotational speed or phase angle of any individual propulsor from the plurality of propulsors 106 is not synchronized or in operational phase angle region with the rotational speed or phase angle of the generator (220). For example, based on the information received from AC drive circuit 114, controller 112 may compare the information received about each of propulsors 106 with information received about AC generator 102 to determine whether the rotational speed, voltage, frequency, and/or phase of any of propulsors 106 is out-of-synch with the rotational speed, voltage, frequency, and/or phase of AC generator 102.

In cases where controller 112 determines that none of the propulsors is out-of-synchronization with the generator (the "No" branch of decision block 240), controller 112 may resume regular operations for controlling system 100 and return to step (200). However, following an in-operation event causing synchronicity between the generator and a propulsor motor to be lost (e.g., following a torque spike caused by debris and/or bird ingestion by a propeller fan), controller 112 may determine that one of the propulsors is out-of-synchronization with the generator (the "Yes" branch of decision block 240). For example, in order to operate system 100 efficiently and to minimize unwanted noise or vibrations that can arise when synchronization between AC generator 102 and one or more of propulsors 106 is lost, controller 112 may continuously or periodically monitor and maintain the respective rotational speed of propulsors 106 to be within an acceptable tolerance of the rotational speed of generator 102. In response to determining that the rotational speed of propulsors 106A is out of tolerance (e.g., greater than or less than by a threshold amount) than the rotational speed of AC generator 102, controller 112 may determine that motor 108A of propulsor 106A needs resynchronization (the "Yes" branch of decision block 240).

Responsive to determining that the rotational speed or phase angle of the individual propulsor is not synchronized or in operational phase angle region with the rotational speed of the generator, controller 112 may control at least one of the rotational speed of the generator, nozzle area of the individual propulsor, or a pitch angle of the individual propulsor to synchronize the rotational speed of the individual propulsor with the rotational speed of the generator (260). In other words, rather than relying on variable speed drive systems to regain synchronization after an in-operation, unsynchronization event, controller 112 may perform windmilling-based control techniques to bring an out-of-synch individual propulsor back in synchronization with the generator.

Controller 112 may disengage the individual propulsor from an electrical bus shared between the plurality of propulsors and the generator (250) prior to controlling the rotational speed of the generator or the pitch angle of the individual propulsor to synchronize the rotational speed of the individual propulsor with the rotational speed of the generator (260). For example, controller 112 may send a signal to isolation device 105A that brings propulsor 106A offline by causing isolation device 105A to prevent motor 108A from receiving electrical current from AC generator 102. With propulsor 106A offline, propulsor fan 110A may be allowed to windmill as the other propulsors 106B-106N remain online and providing thrust to system 100.

Controller 112 may manipulate the pitch angle of propulsor 106A and/or the rotational speed of generator 102 to bring the rotational speed or phase angle of propulsor 106A back in synchronization with the rotational speed or operational phase angle region of generator 102 (and the rotational speed of propulsors 106B-106N). In some examples, to synchronize the rotational speed of propulsor 106A with the rotational speed of AC generator 102, controller 112 may send a signal to propulsor 106A that decreases the pitch angle $\gamma$ of propulsor fan 110A of propulsor 106A relative to its respective angle of attack a. The angle of attack a is the angle between the velocity vector of the air seen in the reference frame of the fan or propeller blade relative to the chord line of the airfoil. By decreasing the pitch angle $\gamma$ of propulsor fan 110A, controller 112 may increase the rotational speed of the individual propulsor.

In some examples, to synchronize the rotational speed of propulsor 106A with the rotational speed of AC generator 102, controller 112 may increase the rotational speed of AC generator 102 to increase the rotational speed of propulsor 106A. In other words, by increasing the throttle of AC generator 102, controller 112 may actually cause the rotational speed of the wind milling propulsor 106A to speed up as the increased throttle increases the rate of airflow passing over propulsor 106A, thereby increasing its rotational speed.

In some examples, to synchronize the rotational speed of propulsor 106A with the rotational speed of AC generator 102, controller 112 may combine an increase in throttle control of AC generator 102 with a decrease in the pitch angle of propulsor 106A to induce an increase in the rotational speed of propulsor 106A. For examples, controller 112 may decrease the pitch angle γ of propulsor 106A relative to its respective angle of attach a prior to increasing the rotational speed of the AC generator 102 to increase the rotational speed of propulsor 106A as the decreased pitch angle γ of propulsor 106A relative to its respective angle of attach a may increase the rate of airflow passing over propulsor 106A, thereby increasing its rotational speed. In some examples, controller 112 may decrease the pitch angle γ of propulsor 106A relative to its respective angle of attach a prior while increasing the rotational speed of the AC generator 102 to increase the rotational speed of propulsor 106A.

Controller 112 may reengage the individual propulsor to the electrical bus in response to determining the rotational speed of the individual propulsor is synchronized with the rotational speed of the generator (270). For example, while varying the pitch control of propulsor 106A and/or rotational speed of generator 102, controller 112 may continuously monitor the rotational speed, voltage, frequency, and/or phase associated with motor 108A of propulsor 106A. When the rotational speed, voltage, frequency, and/or phase comes back within a tolerance of the rotational speed, voltage, frequency, and/or phase associated with generator 102, controller 112 may send a signal to isolation device 105A to bring propulsor 106A back online with AC generator 102.

By enabling propulsion system 100 to resynchronize one or more of propulsors 106 to generator 102 in this way, system 100 need not rely on any variable speed drive systems. Of course, in some examples, system 100 may perform windmilling synchronization techniques such as these in addition to using a variable speed drive system. By bringing an out-of-synch propulsor 106 offline and resynching through windmilling, system 100 may ensure maximum operating capacity from all of propulsors 106, without having increased mass and losses that typically arise from variable speed drive systems. As such, an aircraft that relies on system 100 may operate more efficiently, cost less, and have a greater operating range.

FIGS. 3A-3D are conceptual diagrams illustrating a relationship between the rotational velocity of a propulsor and the pitch angle of the propulsor, in accordance with one or more aspects of the present disclosure. As depicted in FIGS. 3A-3D, the rotational velocity Rω (and therefore the rotational speed ω) of a propulsor, such as any one of propulsors 106 of system 100 of FIG. 1, can be adjusted by varying the pitch angle γ of the propulsor fan of the propulsor.

Figure 3A:
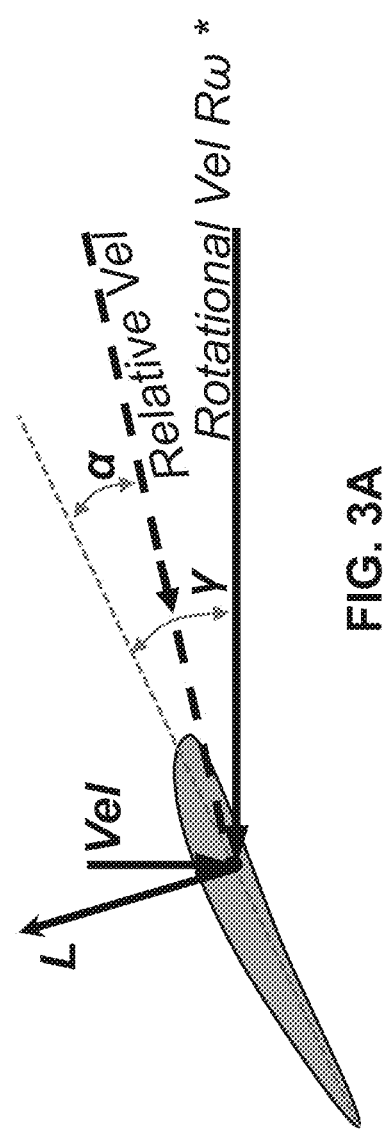
FIGS. 3A-3D are conceptual diagrams illustrating a relationship between the rotational velocity of a propulsor and the pitch angle of the propulsor, in accordance with one or more aspects of the present disclosure.
Figure 3C:
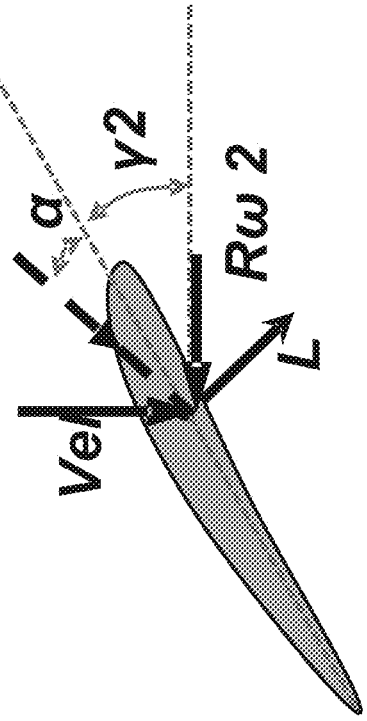
Figure 3B:
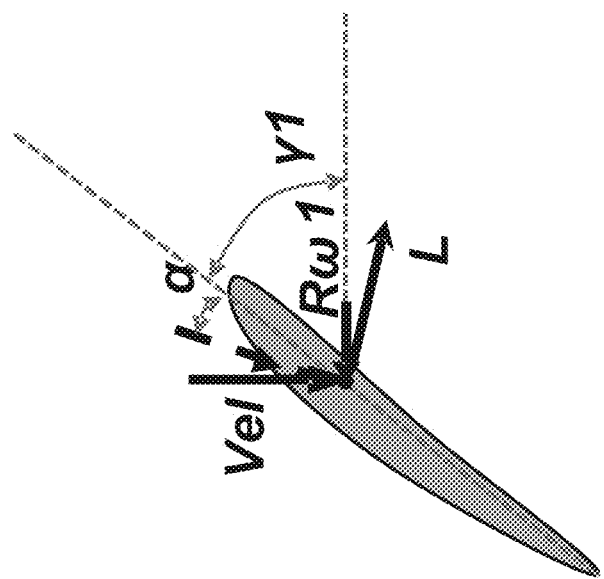
Figure 3D:
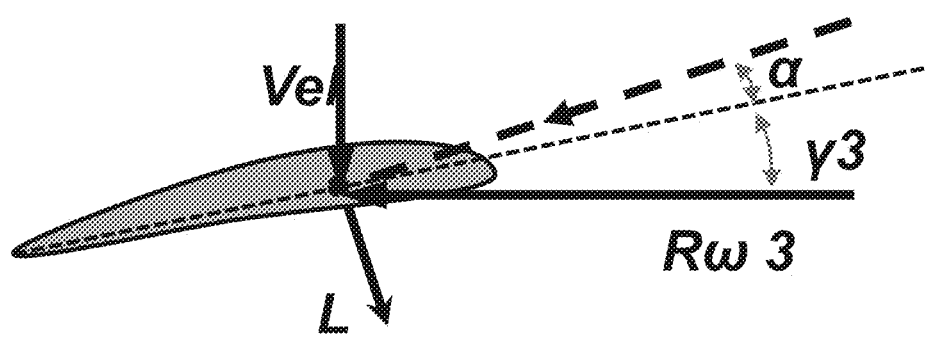

For example, as shown in FIG. 3B, when an aircraft is moving and fluid (e.g., wind) is moving at a velocity Vel, and the pitch angle γ1 of a propulsor fan relative to its attack angle α may have a rotational velocity Rω1. If the aircraft continues to move and the fluid continues to move at a velocity Vel, FIG. 3C shows that by decreasing the pitch of the propulsor fan to a pitch angle γ2, the propulsor fan may increase in rotational speed and have a rotational velocity Rω2. And if the aircraft continues to move and the fluid continues to move at a velocity Vel, FIG. 3D shows that by further decreasing the pitch of the propulsor fan to a pitch angle γ3, the propulsor fan may further increase in rotational speed and have a rotational velocity Rω3. Similarly, FIGS. 3A-3D show that by increasing the pitch angle of the propulsor fan may decrease the rotational speed of that fan.

Accordingly, by following the principles depicted in FIGS. 3A-3D, controller 112 may control the pitch angle of an individual one of propulsors 106 after disengaging the propulsor 106 from AC electrical bus 116 to increase or decrease the rotational speed of that propulsor 106.

Figure 4:
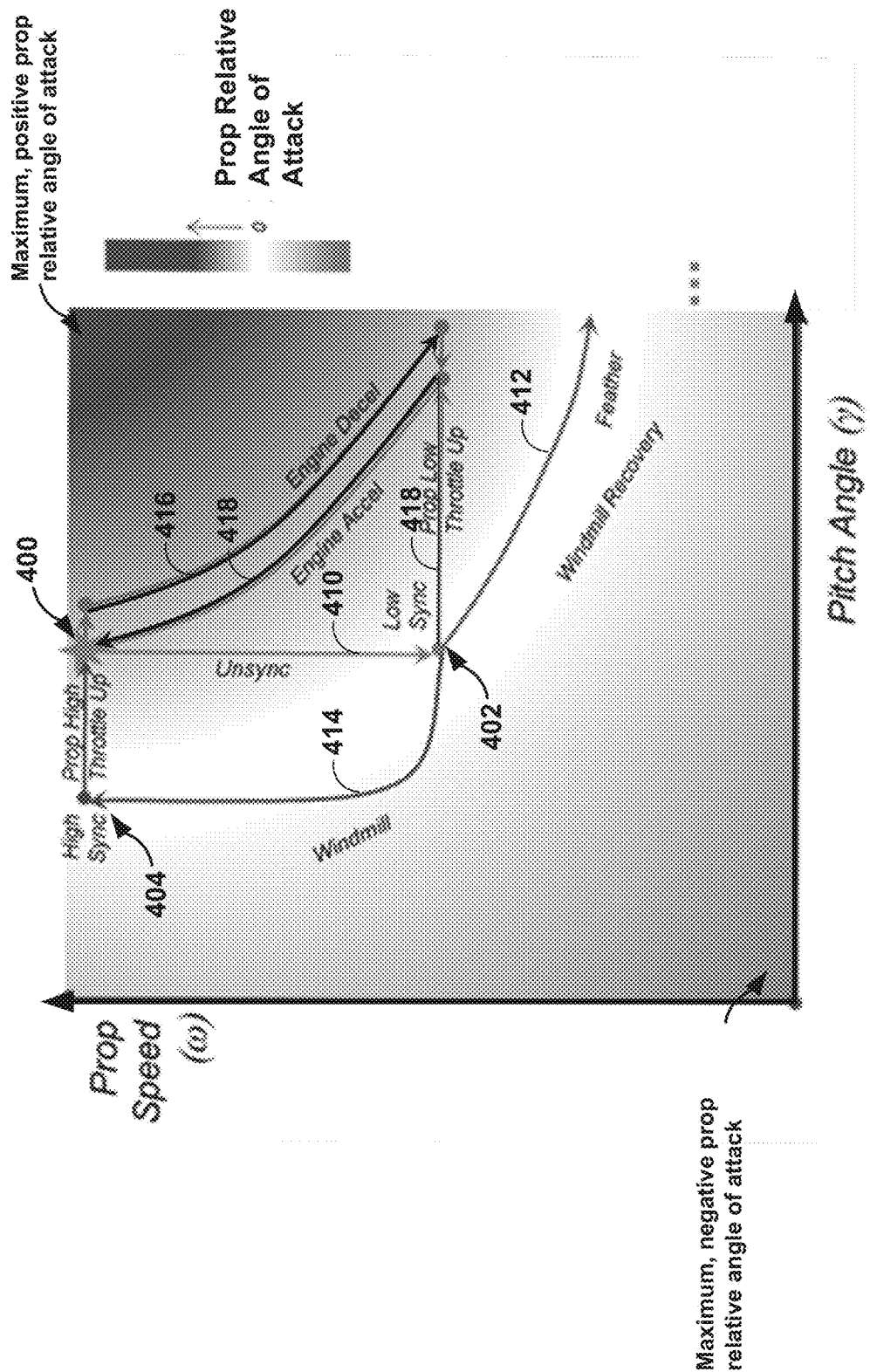
FIG. 4 is a conceptual diagram illustrating different propulsor resynchronization scenarios performed by an example controller configured to maintain synchronization between the multiple propulsors and the shared power source of the example electric propulsion system of FIG. 1, in accordance with one or more aspects of the present disclosure.

FIG. 4 is a conceptual diagram illustrating different propulsor resynchronization scenarios performed by an example controller configured to maintain synchronization between the multiple propulsors and the shared power source of the example electric propulsion system of FIG. 1, in accordance with one or more aspects of the present disclosure. FIG. 4 is described below in the context of system 100 of FIG. 1 as well as operations 200-270 of FIG. 2 as if propulsor 106A has fallen out of synchronization with AC generator 102.

FIG. 4 includes traces 410-418 which demonstrate the pitch angle γ and rotational speed w for different propulsors after an unsynchronization event. Point 400 represents the desired synchronization point, point 402 represents the minimum or low synchronization point, and point 404 represents the maximum or high synchronization point. The high synch is where system 100 may sync without varying the speed/frequency of AC generator 102. The low sync drops the speed/frequency of AC generator 102 to the match the speed of the windmilling propulsor without any windmilling control. Synchronization could be at any combinations of windmilling and generator speed variations. In some examples, "low" means the generator speed is lowered to that of the unsynchronized propulsor, and "high" means the unsynchronized propulsor is increased via previously describe methods to that of the generator.

Trace 410 represents propulsor 106A falling out of synch with the AC bus 116. As shown by trace 410, there may be a rapid decrease in propeller rotational speed co of propulsor 106A after controller 112 determines that propulsor 106A is out of synchronization with AC generator 102 and after controller 112 disengages propulsor 106A from AC bus 116. Trace 410 assumes isolation can occur so propulsor 106A can freewheel without electromagnetic holding torque or vibration. Without isolation, there will be some resistance propulsor rotation. Trace 410 shows that as long as the pitch angle γ of propulsor 106A remains steady after being disengaged from bus 116, eventually the rotational speed of propulsor 106A will stop decreasing and hold steady at point 402 (e.g., the no load point of propulsor 106A for a particular pitch).

From point 402, controller 112 may determine that propulsor 106A cannot be recovered. For example, if propulsor 106A suffers from damage or otherwise cannot be resynchronized following an unsynchronization event. Controller 112 may increase the pitch angle of propulsor 106A according to trace 412. Trace 412 represents the ideal path for windmilling propulsor 106A at no load.

Conversely, from point 402, controller 112 may determine that propulsor 106A can be recovered. Trace 414 represents the process of using variable pitch to being the propeller rotational speed ω back up to point 404 which is the original rotational speed needed for synchronization. For example, controller 112 may decrease the pitch angle γ of propulsor 106A and as the pitch angle γ of propulsor 106A decreases, the rotational speed of ω of propulsor 106A may increase to point 404. By connecting propulsor 106A to AC electrical bus 116 at this high speed synch point 404, controller 112 may in effect reengage propulsor 106A with AC generator 102 at no load or minimal load. In addition, after reaching the high speed synch point 404, controller 112 may then increase the pitch angle γ of propulsor 106A to bring propulsor 106A back to the original thrust point 400.

During this single propulsor unsynchronization (e.g., between point 400, 402, and 404) the pitch control of the other propulsors 106 may be controlled so as to maintain a desired thrust point. During the resync throttle up (e.g., between point 404 and 400) when the rotational speed of AC generator 102 is increased, the pitch control of the other propulsors 106 may be throttled back down. Said differently, controller 112 may maintain each propulsor 106 from the plurality of propulsors 106, other than individual propulsor 106A, at a desired thrust point while synchronizing the rotational speed of propulsor 106A with the rotational speed of generator 102.

For example, controller 112 may control a respective pitch angle of each remaining propulsor 106B-106N to maintain the desired thrust point. In some examples, controlling the respective pitch angle of each remaining propulsor 106B-106N to maintain the desired thrust point may include varying the respective pitch angle of each remaining propulsor 106B-106N in an opposite direction at which the controller varies the pitch angle of propulsor 106A. In other words, as controller 112 is decreasing the pitch angle of propulsor 106A to bring propulsor 106A back in-synch with generator 102, controller 112 may increase the pitch angle of one or more of the other propulsors 106B-106N so as to maintain the desired thrust point of system 100.

Another way to recover propulsor 106A from point 402 after propulsor 106A has fallen out-of-synchronization with generator 102 is shown by trace 418. As shown in trace 418, in some examples, controller 112 may synchronize the rotational speed of the propulsor 106A with the rotational speed of generator 102 by decreasing the pitch angle of propulsor 106A relative to an angle of attack of propulsor 106A while simultaneously increasing the rotational speed of generator 102 to increase the rotational speed of propulsor 106A.

Said differently, trace 418 shows a combination of turbogen speed control and pitch control to allow synchronization. A low speed sync point 402 may be set by controller 112 altering the rotational speed of generator 102. In this case the propulsor rotational speed of propulsor 106A is set by the no load rotational speed of the propulsor at a given pitch angle.

Trace 416 represents the rotational speed and pitch variations for non unsynced propulsors during sync and resync events. When a propulsor 106A becomes unsynchronized, controller 112 may maintain thrust by increasing the load on the unaffected propulsors 106B-106N by varying the respective pitch control of propulsors 106B-106N. As generator 102 decelerates, propulsors 106 also decelerate. In order to maintain the desired thrust point controller 112 increases the pitch of propulsors 106B-106N. After resynchronizing propulsor 106A, controller 112 may increase the rotational speed of generator 102 and as the rotational speed of propulsors 106B-106N increases, controller 112 may reduce the pitch of propulsors 106B-106N to maintain a desired thrust point.

Accordingly, traces 410-418 represent two potential resynch options using a either propulsor pitch or generator rotational speed as the resync control variable. However, a combination of propulsor pitch and generator rotational speed may be used to perform synchronization at a sync point between the low and high sync points (e.g., most likely at the zero load position). A system that performs the techniques described herein may have the ability to command generator rotational speed, propeller pitch angles, and electrical interrupt switches. Such a system may receive thrust and moment control inputs from a flight control system and may monitors generator and propulsor speeds, pitch angles, and electrical signals by receiving information from the flight control system or other onboard systems and sensors. Based on the information received from the flight control system and other onboard systems and sensors, the example system may determine when the system is at a place where synchronization can be achieved as well as to determine the particular pitch angles required to produce the desired cumulative thrust from all propulsors.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A propulsion system, comprising:
an electrical bus;
a generator configured to provide electrical power to the electrical bus;
a propulsor configured to provide thrust by simultaneously being driven by the electrical power at the electrical bus; and
a controller configured to synchronize a rotational speed of the propulsor with a rotational speed of the generator after the propulsor has become unsynchronized with the rotational speed of the generator by controlling at least one of a nozzle area or a pitch angle of the propulsor,
wherein the controller is configured to synchronize the rotational speed of the propulsor with the rotational speed of the generator by controlling the pitch angle of the individual propulsor prior to simultaneously controlling the pitch angle and the rotational speed of the generator.

2. The propulsion system of claim 1, wherein to synchronize the rotational speed of the propulsor with the rotational speed of the generator, the controller is configured to increase the rotational speed of the propulsor by varying the nozzle area of the propulsor.

3. The propulsion system of claim 1, wherein to synchronize the rotational speed of the propulsor with the rotational speed of the generator, the controller is configured to increase the rotational speed of the propulsor by decreasing the pitch angle of the propulsor relative to an angle of attack of the propulsor.

4. The propulsion system of claim 1, wherein to synchronize the rotational speed of the propulsor with the rotational speed of the generator, the controller is configured to increase the rotational speed of the generator.

5. The propulsion system of claim 1, further comprising one or more additional propulsors, wherein the controller is configured to maintain each of the one or more additional propulsors at a desired thrust point while synchronizing the rotational speed of the propulsor with the rotational speed of the generator.

6. The propulsion system of claim 5, wherein the controller is configured to maintain each of the one or more additional propulsors at the desired thrust point while synchronizing the rotational speed of the propulsor with the rotational speed of the generator by controlling at least one of a pitch angle or a nozzle area of each additional propulsor.

7. The propulsion system of claim 1, wherein the controller is further configured to:
disengage the propulsor from the electrical bus prior to controlling the nozzle area or the pitch angle of the propulsor; and
reengage the propulsor to the electrical bus in response to determining that the rotational speed of the individual propulsor is synchronized with the rotational speed of the generator.

8. A method comprising:
determining, by a controller of a propulsion system, whether a rotational speed of an individual propulsor from a plurality of propulsors is synchronized with a rotational speed of a generator that is driving the plurality of propulsors; and
responsive to determining that the rotational speed of the individual propulsor is not synchronized with the rotational speed of the generator, controlling, by the controller, at least one of a nozzle area or a pitch angle of the individual propulsor to synchronize the rotational speed of the individual propulsor with the rotational speed of the generator,
wherein synchronizing the rotational speed of the individual propulsor with the rotational speed of the generator comprises controlling the pitch angle of the individual propulsor prior to simultaneously controlling the pitch angle and the rotational speed of the generator.

9. The method of claim 8, wherein synchronizing the rotational speed of the individual propulsor with the rotational speed of the generator comprises increasing the rotational speed of the individual propulsor by varying the nozzle area of the individual propulsor.

10. The method of claim 8, wherein synchronizing the rotational speed of the individual propulsor with the rotational speed of the generator comprises increasing the rotational speed of the individual propulsor by decreasing the pitch angle of the individual propulsor relative to an angle of attack of the individual propulsor.

11. The method of claim 10, wherein synchronizing the rotational speed of the individual propulsor with the rotational speed of the generator further comprises increasing the rotational speed of the individual propulsor by increasing the rotational speed of the generator.

12. The method of claim 8, further comprising maintaining, by the controller, each propulsor from the plurality of propulsors, other than the individual propulsor, at a desired thrust point while synchronizing the rotational speed of the individual propulsor with the rotational speed of the generator.

13. The method of claim 12, further comprising maintaining, by the controller, each remaining propulsor from the plurality of propulsors, other than the individual propulsor, at the desired thrust point while synchronizing the rotational speed of the individual propulsor with the rotational speed of the generator by controlling at least one of a pitch angle or a nozzle area of each remaining propulsor.

14. The method of claim 13, wherein controlling at least one of the pitch angle or the nozzle area of each remaining propulsor to maintain the desired thrust point further comprises at least one of controlling, by the controller, the pitch angle or the nozzle area of each remaining propulsor in an opposite direction of a direction at which the controller controls the pitch angle or the nozzle area of the individual propulsor.

15. The method of claim 8, further comprising:
disengaging, by the controller, the individual propulsor from an electrical bus shared between the plurality of propulsors and the generator prior to controlling the nozzle area or the pitch angle of the individual propulsor to synchronize the rotational speed of the individual propulsor with the rotational speed of the generator; and reengaging, by the controller, the individual propulsor to the electrical bus in response to determining the rotational speed of the individual propulsor is synchronized with the rotational speed of the generator.

16. A system comprising:

means for determining whether a rotational speed of an individual propulsor from a plurality of propulsors of a propulsion system is synchronized with a rotational speed of a generator; and means for synchronizing the rotational speed of the individual propulsor with the rotational speed of the generator by controlling, in response to determining that the rotational speed of the individual propulsor is not synchronized with the rotational speed of the generator, at least one of a pitch angle or a nozzle area of the individual propulsor to synchronize the rotational speed of the individual propulsor with the rotational speed of the generator, wherein the means for synchronizing the rotational speed of the individual propulsor with the rotational speed of the generator comprises means for controlling the pitch angle of the individual propulsor prior to simultaneously controlling the pitch angle and the rotational speed of the generator.

17. The system of claim 16, wherein the means for synchronizing the rotational speed of the individual propulsor with the rotational speed of the generator includes at least one of means for decreasing the pitch angle relative to an angle of attack of the individual propulsor or means for varying a nozzle area of the individual propulsor.

18. The system of claim 16, further comprising means for maintaining each propulsor from the plurality of propulsors, other than the individual propulsor, at a desired thrust point while synchronizing the rotational speed of the individual propulsor with the rotational speed of the generator.

19. The system of claim 16, further comprising:

means for disengaging the individual propulsor from an electrical bus shared between the plurality of propulsors and the generator prior to controlling the pitch angle or nozzle area of the individual propulsor to synchronize the rotational speed of the individual propulsor with the rotational speed of the generator; and means for reengaging the individual propulsor to the electrical bus in response to determining that the rotational speed of the individual propulsor is synchronized with the rotational speed of the generator.

* * * * *